US005938310A

United States Patent [19]

Leaman et al.

[11] Patent Number: 5,938,310

[45] Date of Patent: Aug. 17, 1999

[54] MULTIPLE LENS COMPONENT

[75] Inventors: Christopher Scott Leaman, Elizabethtown; Robert Neil Whiteman, Jr., Middletown; Wayne Samuel Davis, Harrisburg, all of Pa.

[73] Assignee: The Whitaker Corporation, Wilmington, Del.

[21] Appl. No.: 08/909,107

[22] Filed: Aug. 11, 1997

Related U.S. Application Data

[63] Continuation-in-part of application No. 08/877,048, Jun. 17, 1997.

[51] Int. Cl.[6] .................... G01D 11/28

[52] U.S. Cl. .................... 362/26; 362/30; 362/551; 362/581; 362/92

[58] Field of Search .................... 362/226, 559, 362/586, 26, 27, 242, 244, 249, 374, 375, 30, 92, 93, 551

[56] References Cited

U.S. PATENT DOCUMENTS

| | | | |
|---|---|---|---|
| 3,978,845 | 9/1976 | Houbolt | 126/39 R |
| 4,153,325 | 5/1979 | Asick | 339/99 R |
| 4,181,393 | 1/1980 | Lill | 339/98 |
| 4,466,050 | 8/1984 | Lockard | 362/307 |
| 5,309,634 | 5/1994 | Van Order et al. | 29/863 |
| 5,327,328 | 7/1994 | Simms et al. | 362/26 |
| 5,403,195 | 4/1995 | Thrush et al. | 439/69 |
| 5,420,762 | 5/1995 | Lewis | 362/61 |
| 5,439,384 | 8/1995 | Thrush et al. | 439/69 |
| 5,484,186 | 1/1996 | Van Order et al. | 296/97.5 |
| 5,504,660 | 4/1996 | Heidorn | 362/27 |
| 5,755,508 | 5/1998 | Wheaton | 362/249 |

OTHER PUBLICATIONS

*Jemco Catalog*, pp. 8–10; (date unknown); Jemco Engineering Co., Minooka, IL.

*General Electric Drawing No. 205C1154 Sheet 1*, 1988; General Electric, Louisville, KY.

*General Electric Drawing No. 205C1154 Sheet 2*, 1989; General Electric, Louisville, KY.

*Primary Examiner*—Sandra O'Shea
*Assistant Examiner*—Michael J. Smith
*Attorney, Agent, or Firm*—Anton P. Ness

[57] ABSTRACT

Multiple lens component (10,110) includes a transverse body section (12,112) for mounting along a front panel surface and defining a plurality of lens sites (14;114,116). Each lens site includes a rear projection (16;124,126,128, 130) extending rearwardly from the body section to extend through a corresponding panel aperture (18;120,122) and define a light transmission path to the lens site from rearwardly of the panel (20,118). The component includes panel-mounting latches (30,132) on the rear projections, and further includes additional latches (32,134) enabling mounting thereto of a lamp assembly (28).

10 Claims, 5 Drawing Sheets

MULTIPLE LENS COMPONENT

RELATED APPLICATION INFORMATION

This is a Continuation-in-Part Application of U.S. patent application Ser. No. 08/877,048 filed Jun. 17, 1997, pending.

FIELD OF THE INVENTION

This relates to the field of light transmission and more particularly to lenses.

BACKGROUND OF THE INVENTION

A lamp assembly is disclosed in U.S. patent application Ser. No. 08/877,048, that includes a plurality of lamps and is mountable to a panel to illuminate lenses on a forward surface of the panel to serve as indicators; such an arrangement is useful particularly in appliances to indicate that certain components of the appliance are either powered or not powered. In one aspect of the assembly, it is easily mountable without additional fastening components to rearward projections of the several lenses already mounted through respective panel apertures from the forward surface. Previously, individual lamp assemblies were associated with discrete ones of the lenses.

SUMMARY OF THE INVENTION

The present invention provides a one-piece component that includes several lens sites and is mountable as a unit to the panel. A transverse body section includes a planar forward surface where at least the portions of the body section at each lens site are transparent to transmit light from rearwardly of the panel. Associated with each lens site is a rearward lens projection defining a light transmission path to the lens site and enabling securing the component to a panel without fasteners and also enables a lamp assembly to be secured to the rearward lens projections without fasteners. In one embodiment each lens site and rearward lens projection is circular and cylindrical, with upper lens sites being more closely spaced than lower lens sites.

In another embodiment each lens site and rearward lens projection is oval in cross-section, such that upper lens sites when smaller and more closely spaced than the lower lens sites altogether provide a sense of perspective indicative of being associated with and representing appliance components located rearwardly in the appliance.

Optionally, with either embodiment, the transverse body section may be opaque except at the lens sites, such as being formed of opaque material, or is translucent such as by texturing of the front surface. Further, the body section may be slightly domed to protrude incrementally from the panel surface after mounting.

Embodiments of the multiple lens component will now be described by way of example with reference to the accompanying drawings.

DETAILED DESCRIPTION

Figure 1:
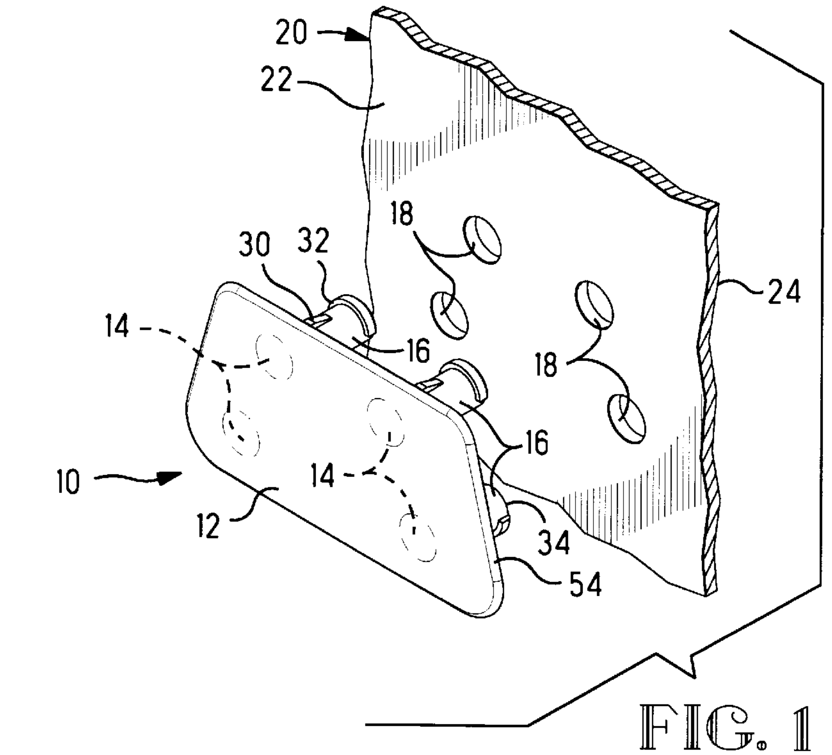
FIG. 1 is an isometric view of a multiple lens component being mounted to a panel forward surface, with lens sites shown in phantom.
Figure 4:
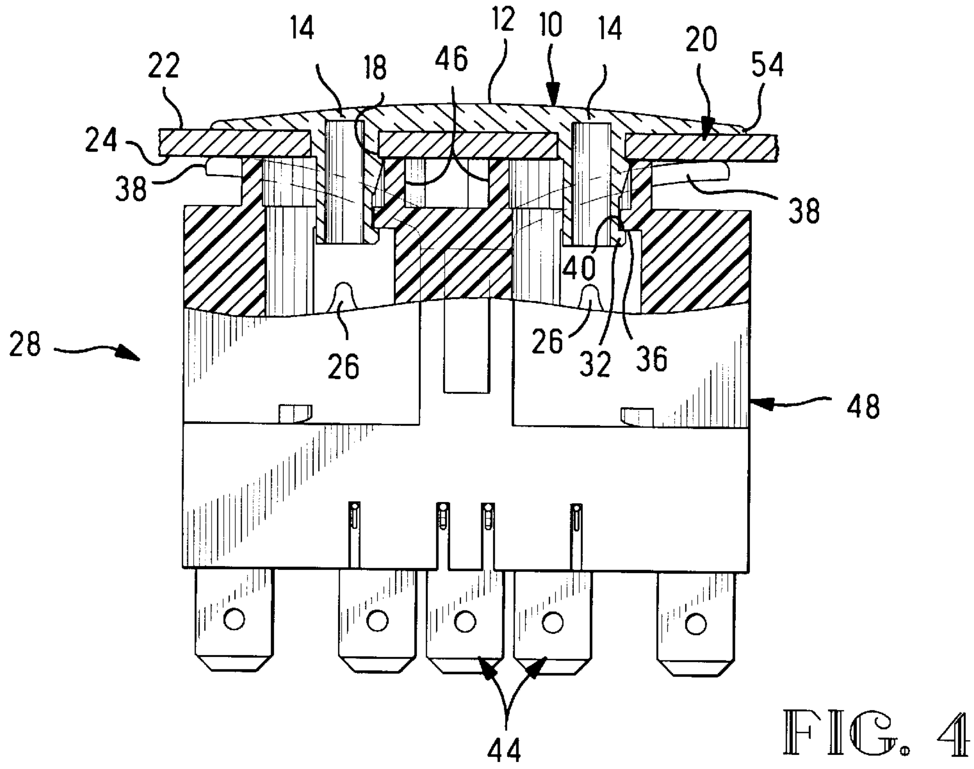
FIGS. 3 and 4 are longitudinal section views of the lamp assembly and panel of FIG. 2 prior to and after mounting of the lamp assembly to the rearward lens projections.
Figure 2:
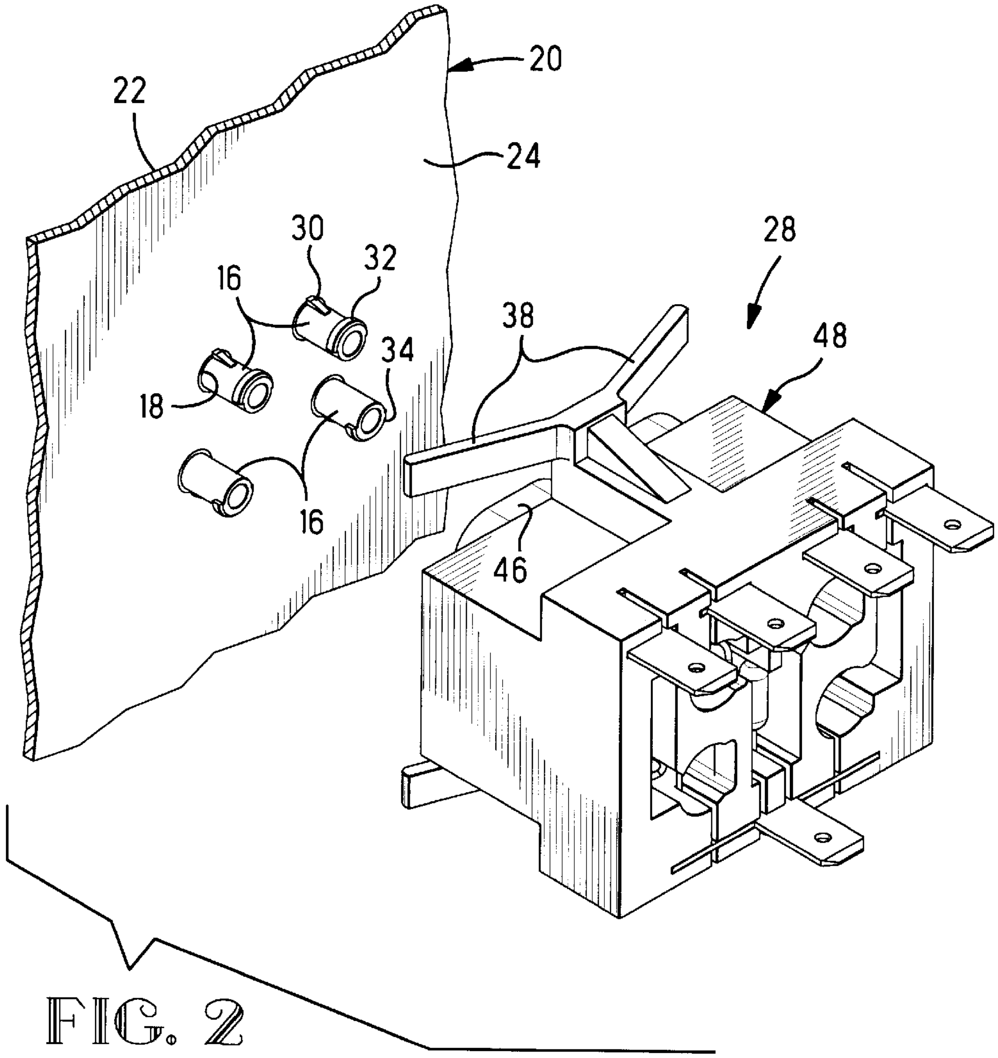
FIG. 2 is an isometric view of a rear surface of the panel of FIG. 1 illustrating rearward lens projections to which a lamp assembly is to be mounted.
Figure 5:
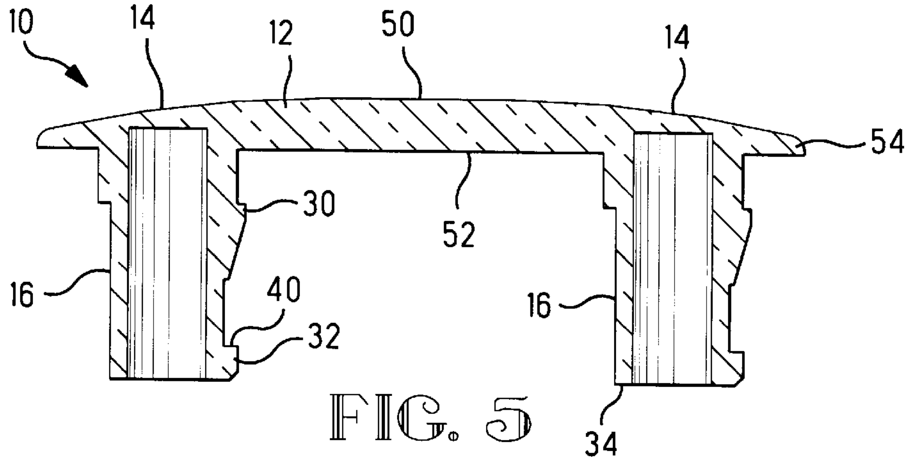
FIGS. 5 and 6 are a cross-sectional and a bottom view of the multiple lens component of FIGS. 1 to 4.
Figure 3:
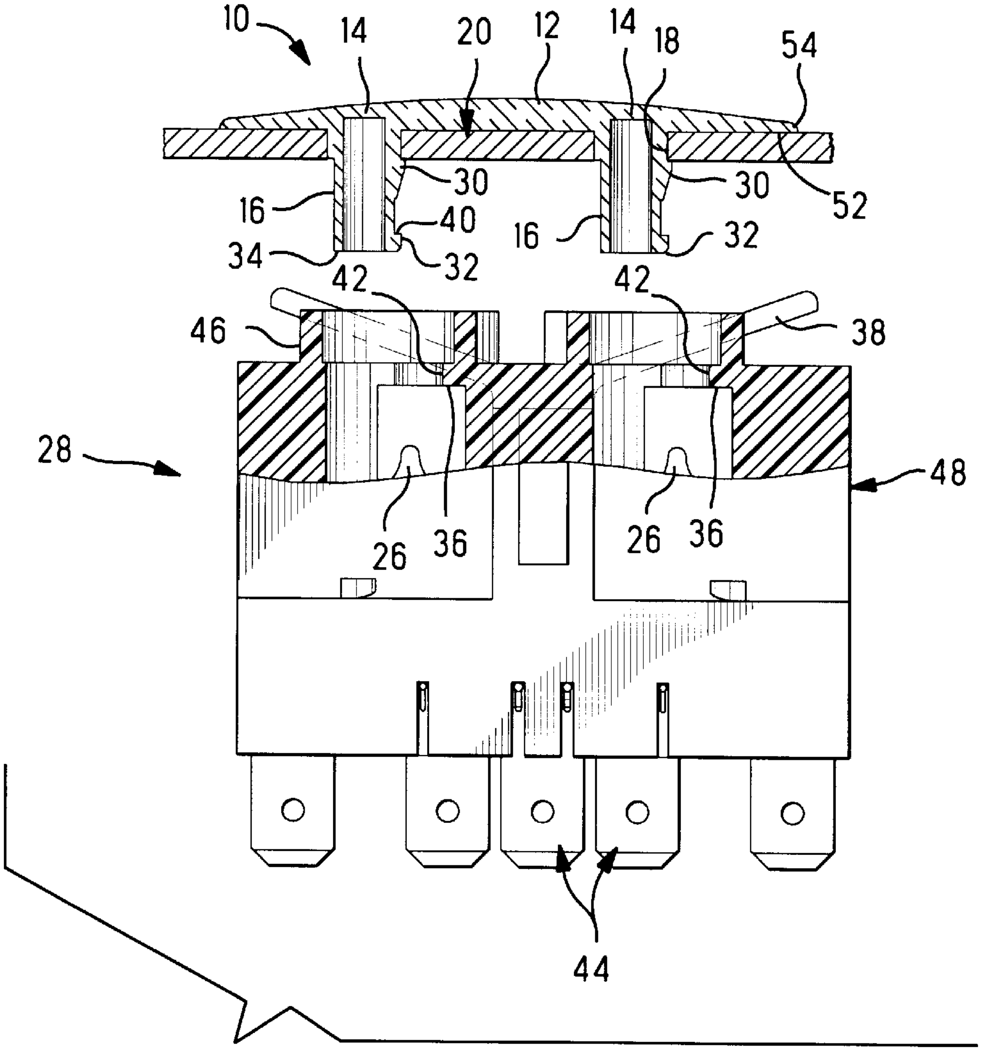
Figure 6:
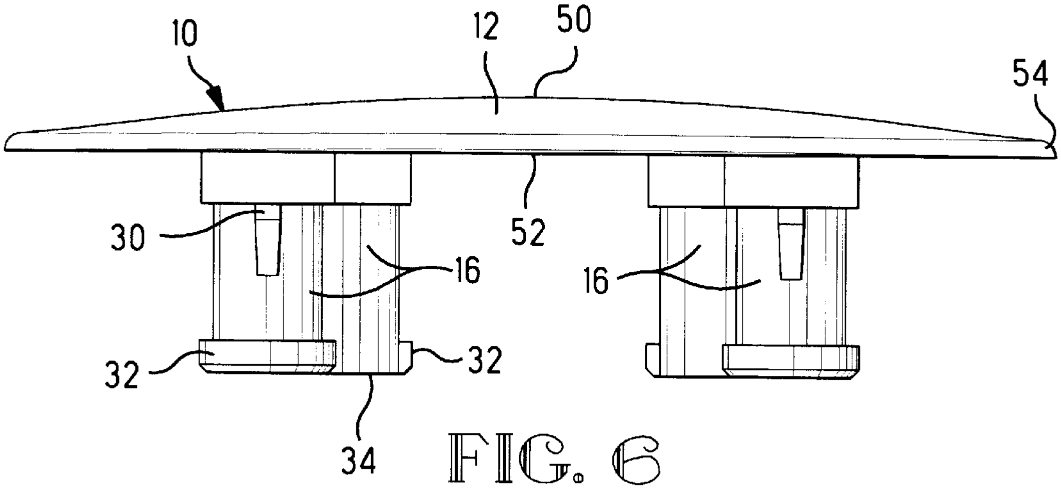

The first embodiment of multiple lens component 10 as shown in FIGS. 1 to 6, includes a transverse body section 12 and a plurality of lens sites 14 (in phantom) rearwardly from each of which extends a rearward lens projection 16 that is preferably hollow to define a light transmission path extending to its lens site. Rearward lens projections are associated with respective apertures 18 of panel 20 having a front surface 22 to which the component is to be mounted, and that extend therethrough and beyond a rear panel surface 24. Lamps 26 of lamp assembly 28 (FIGS. 2 to 4) are aligned with respective rearward lens projections 16 upon mounting of the lamp assembly along rear panel surface 24 to illuminate respective lens sites 14 along front panel surface 22 when respective circuits are completed within the appliance by activation of appliance components, such as burners of a range.

Each rearward lens projection 16 includes panel-mounting latches 30 and also includes assembly-mounting latches 32 located adjacent rearward end 34 thereof. As disclosed in U.S. patent application Ser. No. 08/877,048, lamp assembly 28 includes cooperating ledges 36 that seat forwardly of latches 32 during assembly mounting, with resilient arms 38 biased against rear panel surface 24 and pressing ledges 36 against forwardly facing surfaces 40 of latches 32 to maintain the lamp assembly securely in position after mounting, without additional fasteners, within the appliance. Lamp assembly 28 receives latches 32 into openings 42 forwardly of each lamp 26, and the openings are laterally elongate to enable the assembly to be moved laterally after latches 32 are received thereinto to latch the ledges 36 forwardly of forwardly facing surfaces 40.

Lamp assembly 28 is seen to have contacts 44 to which conductors (not shown) will be electrically connected that define circuits that become energized upon activation of a respective appliance component and in turn energize the respective lamp 26. Lamp assembly 28 also includes forwardly extending panel-abutting flanges 46 of an opaque insulative housing 48 surrounding the respective rearward lens projections after assembly mounting, with each flange being associated with a particular lens site 14 and preventing light from adjacent illuminated lamps from improperly reaching that lens site and erroneously signifying component activation of the component associated with that lens site.

Multiple lens component 10 is moldable as an integral member from transparent thermoplastic material such as LEXAN 141R polycarbonate resin, sold by General Electric Co., GE Plastics Division of Pittsfield, Mass., and is preferably red in color as is commonly used for indicator lamps. Transverse body section 12 can be seen to have a dome-shaped front surface 50 that protrudes slightly forwardly from front panel surface 22, and a planar rear surface 52 that lies flush against the front panel surface upon mounting thereto. Peripheral edges 54 of body section 12 are thin to present a minimized height forwardly of the front panel surface for aesthetic appeal and to inhibit snagging and stubbing during appliance use and cleaning.

Figure 7:
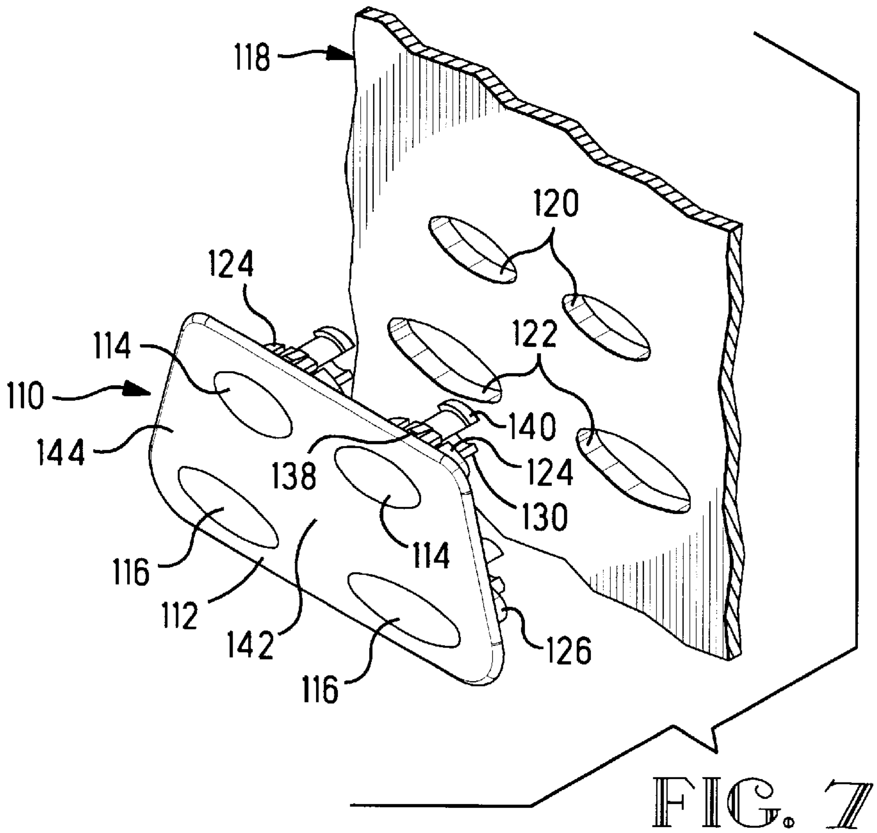
FIGS. 7 and 8 are isometric views similar to FIGS. 1 and 2 showing a second embodiment of multiple lens component having oval lens sites.
Figure 8:
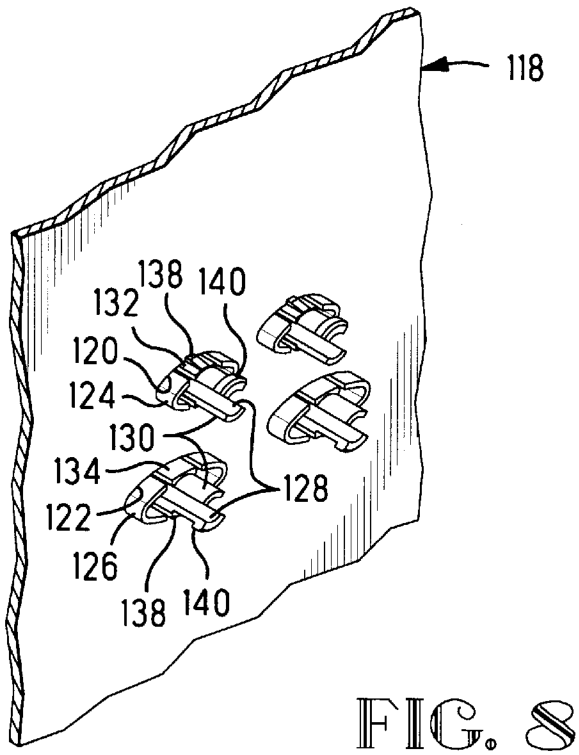
Figure 9:
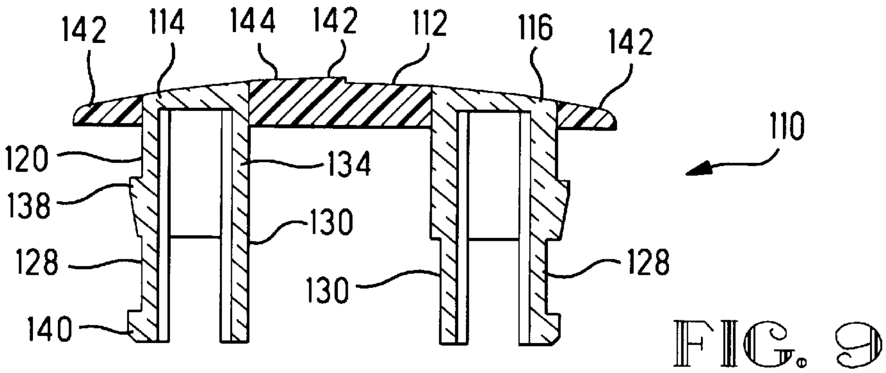
FIGS. 9 to 11 are cross-sectional and bottom views of the second embodiment of multiple lens component of FIGS. 7 and 8.
Figure 10:
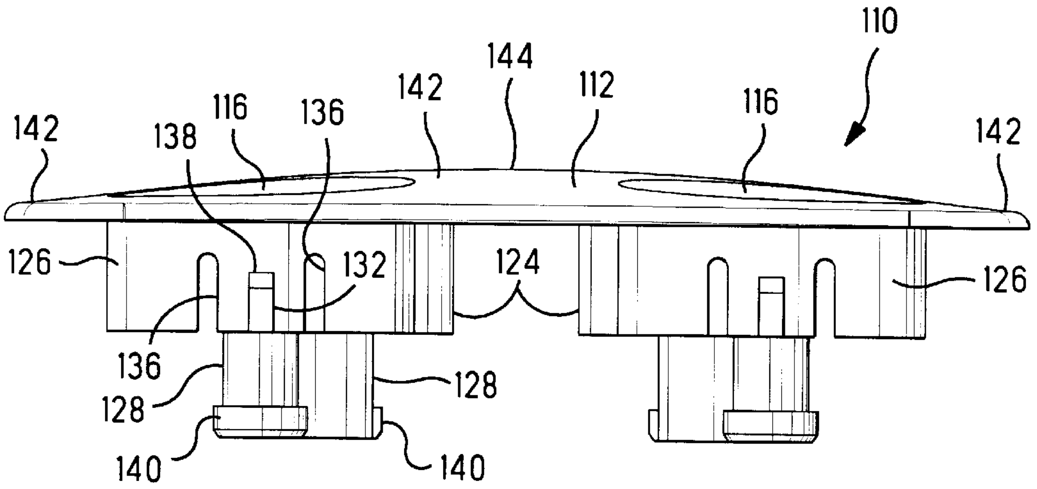
Figure 11:
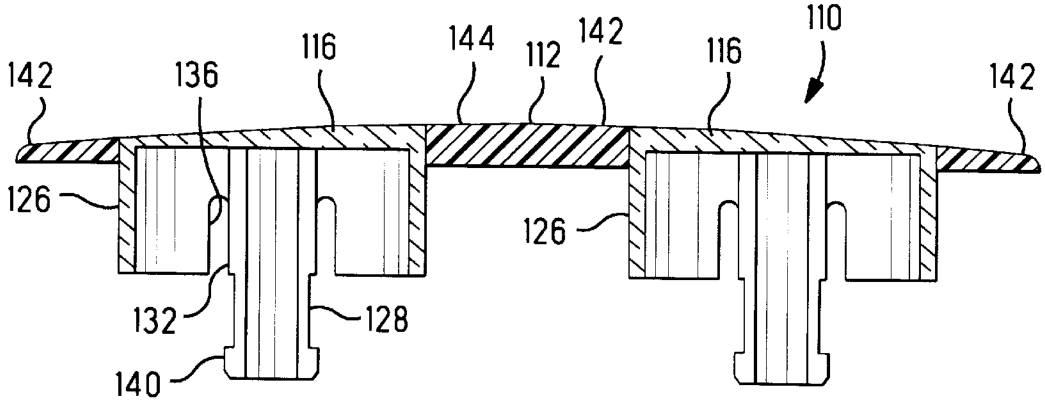

A second embodiment of multiple lens component 110 is disclosed in FIGS. 7 to 11, having a transverse body section 112 and a plurality of lens sites 114,116, wherein each lens site 114,116 is oval in shape. Upper lens sites 114 are spaced more closely together than lower lens sites 116 and are also smaller in overall size. Panel 118 is seen to have correspondingly oval apertures 120,122 through which will extend oval-shaped short rear lens projections 124,126.

Semicylindrical elongate projections 128,130 are seen projecting rearwardly in pairs from and beyond the central portions 132,134 of each of short projections 124,126, to simulate projections 16 of multiple lens component 10 of FIGS. 1 to 6. By reason of slots 136 separating central portions 132,134 from the remainder of the oval-shaped short rear lens projections 124,126, each elongate projection 128 is adapted to be deflectable during panel mounting and includes panel-mounting latch 138 and an assembly-mounting latch 140. Multiple lens component 110 is mounted to panel 118 by the panel-mounting latches 138 of the four elongate projections 128, with the projections 128 of different lens sites 114,116 arranged to face in opposed directions from each other, as with latches 32 of component 10 Assembly-mounting latches 140 enable mounting of a lamp assembly similar to lamp assembly 28 of FIGS. 3 to 5 in similar fashion. Preferably the panel-abutting flanges of a lamp assembly for use with multiple lens component 110 provide panel-abutting flanges that are shaped to accommodate the oval shape of short projections 124,126 when received thereinto during lamp assembly mounting.

Optionally, multiple lens component 110 may be molded such that each lens site 114,116 is transparent while all surrounding portions 142 of body section 112 are either translucent or opaque. Translucence can be selectively imparted to the component by providing a texture or pattern on the forward surface 144 of body section 112 except at lens sites 114,116, such as crossing grid lines small or microscopic in size from the surfaces of the walls of the mold cavity. Opacity can result from the component being molded from two materials, one of which is transparent and the other of which is opaque; molding procedures are known in which a single unitary component is moldable in stages such that first portions are molded from a first material and second portions are molded from a second material, where the first and second materials are compatible and joined integrally to each other; the first material for lens sites 114,116 and rearward projections 124,126,128,130, 132,134 would be transparent, such as LEXAN 141R polycarbonate resin, and the second material defining the body section would be opaque, such as XENOY 5230 polycarbonate/polybutylene terephthalate resin sold by General Electric Co., GE Plastics Division. The projections are preferably transparent to act as light guides.

The multiple lens component may also be initially formed as a plurality of lenses of transparent material, with rearward projections, and a body section of opaque material having apertures at lens sites into which the lenses are disposed and secured (not shown). The body section may also provide rear flanges at each lens site on which the assembly-mounting latches and panel-mounting latches are defined, along and within which extend the rearward projections of the lens members to serve as light guides. The lens members may be formed as an integral member by being joined together by a transverse planar section to facilitate securing to the body section such as by heatstaking or by force fit or bonding.

The multiple lens components of the present invention facilitate establishing of a plurality of lens sites on a panel, such as to serve as indicators. The components also facilitate mounting of a lamp assembly along the rear surface of the panel. Variations and modifications may be made to the specific embodiments disclosed herein, and are within the spirit of the invention and the scope of the claims.

What is claimed is:

1. A lens component for mounting to a panel of an apparatus, said component comprising:

a transverse body section, and a plurality of lens sites located along a front surface of said body section, each said lens site being transparent and including a rear projection extending from a rear surface of said body section, each said rear projection adapted to be received through an aperture of said panel to which the component is to be mounted, each said rear projection defining a light transmission path extending to a respective said lens site.

2. The lens component of claim 1 wherein at least two said rear projections include panel-mounting latches to enable securing to a respective panel upon said rear extensions being inserted through respective said panel apertures.

3. The lens component of claim 1 wherein said rear projections include assembly-mounting latches at rear ends thereof enabling securing thereto of a lamp assembly.

4. The lens component of claim 1 wherein said rear projections are circular in cross-section, and said lens sites are circular.

5. The lens component of claim 1 wherein said component is an integral member.

6. The lens component of claim 1 wherein short projections adjacent said rear panel surface are oval in cross-section, and said rear projections are defined by pairs of elongate projections protruding beyond said short projections and at least one of each said pair includes a panel-mounting latch to enable mounting of said component to a panel and an assembly-mounting latch to enable mounting to said component of a lamp assembly.

7. The lens component of claim 1 wherein said body section includes portions surrounding said lens sites that are translucent.

8. The lens component of claim 1 wherein said body section includes portions surrounding said lens sites that are opaque.

9. The lens component of claim 8 wherein said rearward projections are transparent.

10. The lens component of claim 8 wherein the component is an integral member formed of opaque and transparent material.

* * * * *